(12) United States Patent
Roth

(10) Patent No.: US 9,218,474 B1
(45) Date of Patent: Dec. 22, 2015

(54) ENHANCED BIOMETRIC SECURITY MEASURES

(71) Applicant: Amazon Technologies, Inc., Seattle, WA (US)

(72) Inventor: Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/154,001

(22) Filed: Jan. 13, 2014

(51) Int. Cl.
*G06F 21/32* (2013.01)

(52) U.S. Cl.
CPC ..................................... *G06F 21/32* (2013.01)

(58) Field of Classification Search
CPC ......................................................... G06F 21/32
USPC ............................................................ 726/19
See application file for complete search history.

(56) References Cited

U.S. PATENT DOCUMENTS

| | | | |
|---|---|---|---|
| 6,477,648 B1* | 11/2002 | Schell et al. ..................... | 726/22 |
| 2005/0245229 A1* | 11/2005 | Brown et al. .............. | 455/404.1 |
| 2006/0075230 A1* | 4/2006 | Baird et al. .................... | 713/168 |
| 2009/0025089 A1* | 1/2009 | Martin et al. ................... | 726/28 |
| 2013/0322705 A1* | 12/2013 | Wong ............................. | 382/118 |

OTHER PUBLICATIONS http://lockwatch.android.informer.com/1.2.3/Lockwatch—Find Stolen Phone 1.2.3 BlokeTech Jul. 26, 2013.*

\* cited by examiner

*Primary Examiner* — Kambiz Zand
*Assistant Examiner* — Benjamin Kaplan
(74) *Attorney, Agent, or Firm* — Lee & Hayes, PLLC

(57) ABSTRACT

Functionality is disclosed for enhancing the security of a computing device equipped with a fingerprint input device. A pre-unlock operation is performed when a duress fingerprint is used to access a locked device. The pre-unlock operation may include one or more computer-implemented mechanisms to secure, hide, remove, move, encrypt, disassociate, communicate or modify data stored on the device and/or remote locations. In some embodiments, the pre-unlock operation may direct a device to capture information and communicate such information to remote computers contemporaneously with the receipt of a duress fingerprint.

20 Claims, 9 Drawing Sheets

ENHANCED BIOMETRIC SECURITY MEASURES

BACKGROUND

The use of biometric technologies, such as fingerprint recognition technologies, to unlock frequently accessed computing devices may increase user convenience. However, when compared to devices that utilize only passwords, devices that use biometric security measures can be more susceptible to access without the willing participation of the user. For example, when a device is equipped with a fingerprint reader configured to unlock the device, the security of the device may be compromised if the user is asleep, unconscious, under duress or in another state where one of the user's fingers may be utilized to unlock the device without the user's consent. In another example, fingerprints may be lifted from objects and used to access a device equipped with a fingerprint reader. These security issues, in some cases, may dissuade users from relying on these types of biometric security measures.

The disclosure made herein is presented with respect to these and other considerations.

DETAILED DESCRIPTION

Figure 1:
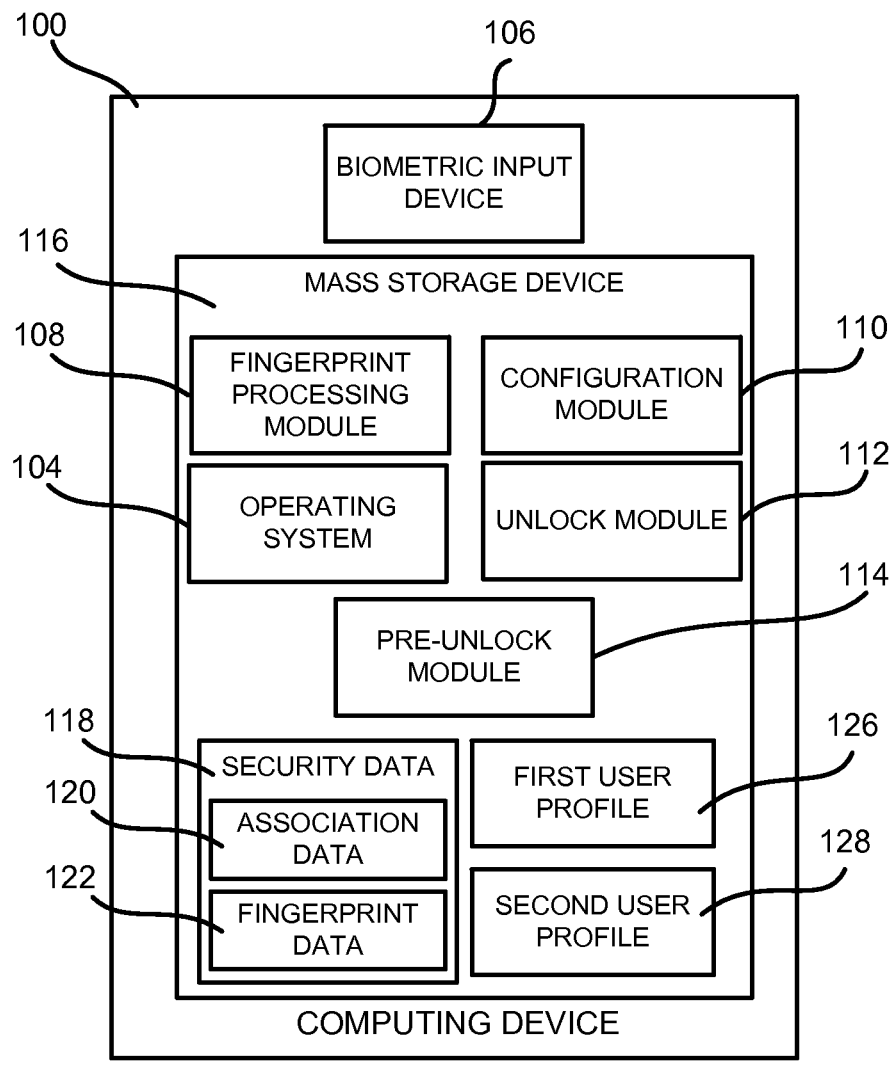
FIG. 1 is a system diagram showing aspects of one illustrative computing device that implements various concepts and technologies disclosed herein.

The technologies described herein may be utilized to enhance the security of a computing device equipped with a fingerprint reader by performing a pre-unlock operation when a pre-defined fingerprint (referred to herein as a "duress fingerprint" or a "duress input") is detected. In embodiments disclosed herein, the pre-unlock operation may include one or more computer-implemented mechanisms to secure, hide, remove, move, encrypt, disassociate, modify or communicate data stored on the computing device and/or in remote locations. The pre-unlock operation is performed prior to unlocking the device for use. The pre-unlock operations described above may be utilized to enhance the security of a device if a user is compelled to access the device under duress or if other types of unauthorized access are attempted. In addition, such mechanisms may improve user privacy by concealing sensitive information in a circumstance where a device is shared with others. As described in more detail below, the pre-unlock operation can be configured to execute without making the operation readily apparent that the device is performing additional operations before or while a device is transitioning to an unlocked state. Additional details regarding these and other aspects presented herein will be described below.

According to embodiments presented herein, a computing device includes a biometric input device for reading an input fingerprint from a user. In illustrative embodiments, the computing device can be configured to associate data identifying a first fingerprint (referred to herein as a "unlock fingerprint" or a "primary input") with an unlock operation that transitions the device from a locked state to an unlocked state in a traditional fashion. The computing device may also be configured to associate data identifying a second fingerprint with a pre-unlock operation.

To transition the computing device from a locked state to an unlocked state, a user provides an input fingerprint to an input device of the computing device. Computer-implemented mechanisms implemented by the computing device generate and utilize data identifying the input fingerprint to determine if the input fingerprint is associated with the first fingerprint or the second fingerprint. If the input fingerprint is associated with the first fingerprint, the computing device performs the unlock operation and transitions the computing device from the locked state to the unlocked state in a traditional fashion. If, however, the input fingerprint is associated with the second fingerprint, the computing device performs a pre-unlock operation before transitioning the computing device from the locked state to the unlocked state.

According to various embodiments, the pre-unlock operation can include one or more computer-implemented mechanisms to secure, hide, remove, disassociate, associate, encrypt, move, communicate and/or modify data stored on the computing device or stored at one or more remote locations. In describing a non-limiting illustrative embodiment, if a computing device is accessed using a fingerprint associated with the pre-unlock operation, the pre-unlock operation can cause the computing device to execute a factory reset operation before transitioning the computing device to an unlocked state. In other embodiments, a pre-unlock operation can be configured to delete all, or selected portions of, stored user data before the computing device transitions to an unlocked state. For example, embodiments of the pre-unlock operation may remove data associated with a particular email account, specific email messages, a password manager, an application, browser data, and/or any other selected data. In other embodiments, the pre-unlock operation may delete one or more encryption keys stored on a device.

In other embodiments, the pre-unlock operation may be configured to hide selected data before the computing device transitions to an unlocked state. In a non-limiting example, a pre-unlock operation may be configured to hide information associated with a particular email account if the device is accessed using a duress input. In another non-limiting example, a user may elect to have their use history, such as Web browsing history, and/or one or more particular contact names hidden from display if the device is accessed using a duress input. The data can remain hidden until the device is locked and subsequently accessed using another designated fingerprint associated with an unlock operation. Embodiments of the pre-unlock operation can be configured with data filters to delete, hide, modify or otherwise process specific information. For instance, and as described in more detail below, a user-modified configuration file may enable an embodiment of a pre-unlock operation to delete or hide text messages associated with a particular phone number or phonebook entry.

In addition to deleting or hiding data, embodiments of the pre-unlock operation may also use alternative profile data to display an alternative operating environment when a device is accessed using a duress input. The alternative profiles can include innocuous, user-selected account information, such as images, applications and other personal information, to mitigate any impression that the device is utilizing an alternative user profile, also referred to herein as an "alternative mode" or a "safe mode."

In another embodiment, the pre-unlock operation may be configured to modify data. For example, such embodiments of the pre-unlock operation may modify data, such as email messages, instant messages, text messages or browsing data, to remove or edit preselected entries or specific types of data. In addition, embodiments of the pre-unlock operation may install or uninstall applications. Other embodiments of the pre-unlock operation may have a range of filtering features to hide, modify or delete items, such as call record, phonebook entry, or emails, that are associated with a particular contact name. As described above, configuration or security data may be used by embodiments of the pre-unlock operation to determine an action for individual records, files, data objects or categories of user information. In addition to using user-controlled configuration files, embodiments of the pre-unlock operation may also use default configuration or security settings that associate operations, such as a delete or modify operation, with individual records, files, data objects or categories of user information.

In yet another illustrative embodiment, a pre-unlock operation may reconfigure security data stored on a computing device and/or at remote locations. In one illustrative example, a computing device stores data of a first fingerprint that is associated with, and used to invoke, an unlock operation. The computing device also stores data of a second fingerprint that is associated with, and used to invoke, the pre-unlock operation. When the second fingerprint is used to access the computing device, the pre-unlock operation may delete the data of the first fingerprint and associate the data of the second fingerprint with the unlock operation. Any associated data stored at a remote server can be modified or removed in a similar way. In this embodiment, the pre-unlock operation enables access to the computing device using the duress input without risking a potential disclosure of a primary fingerprint for accessing the computing device.

In other embodiments, the pre-unlock operation may obtain and/or share many types of information and invoke one or more local or remote actions. For example, if a duress input is detected, the pre-unlock operation may send instructions to a remote computer to provide notice that a duress input was used. In other examples, the pre-unlock operation may send instructions to modify, block or dissociate remotely stored information, such as individual emails, a selection of emails or an entire or multiple accounts. In another illustrative embodiment, the pre-unlock operation may capture, record or obtain information to be sent to a remote computer. For example, the pre-unlock operation may control a camera of the computing device to take a picture or video of the user entering a duress input. The computing device may also obtain data describing the location of the computing device and/or data received from one or more networks. Such data can be sent, along with data of the input fingerprint, to a remote computer. The remote computer may use that information to take one or more actions, such as, for example, tracking the location of the computing device. In these embodiments, the pre-unlock operation may utilize all or any combination of any captured information for communicating with and/or controlling remote computers.

As will be described in detail below, various types of pre-unlock operations may be utilized in conjunction with one another and the various pre-unlock operations disclosed herein may be applied to the same or different sets of data. For instance, as a non-limiting example, a pre-unlock operation may be configured to hide selected contacts in a contacts lists, and at the same time, delete text messages associated with the same or other selected contacts. In addition to the various combination of pre-unlock features, the various pre-unlock features can be activated, deactivated and/or modified depending on other information. For instance, various pre-unlock features can be activated, deactivated or modified based on the geographical location of the computing device and/or the time a fingerprint input is received. The various pre-unlock features can be activated, deactivated or modified based on many other types of information, such as data from a motion sensor, camera, or any other input device. In one non-limiting illustrative embodiment, the pre-unlock operation may delete an email account on a computing device if the computing device is within a designated region, but the pre-unlock operation may also direct a remote server to delete all emails if the computing device is outside the designated region. Additional details regarding these and other aspects of the technologies presented herein will be provided below with regard to FIGS. 1-6.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. It should also be appreciated that aspects of the subject matter described herein may be practiced on, or in conjunction with, wearable computing devices, such as a pair of glasses, a watch, and the like. As mentioned briefly above, the embodiments described herein may be practiced in networked computing environments, where tasks that may be performed by a computing device may control or direct remote computing devices that are linked through a communications network. In such environments, program modules may be located in both local and remote memory storage devices. Additional details regarding the various forms of a computing device, also referred to herein as a "device," for performing a pre-unlock operation will be presented below with regard to FIGS. 1 and 6.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system diagram showing aspects of one illustrative mechanism disclosed herein for receiving an input fingerprint and performing a pre-unlock operation. As shown in FIG. 1, a computing device 100 is disclosed in one embodiment presented herein that is configured to execute an operating system 104. The computing device 100 might be a desktop or laptop computer, a server computer, a smartphone, tablet computer, or another type of stationary or mobile computing device.

The computing device 100 includes a biometric input device 106. In one embodiment, the biometric input device 106 is configured to receive fingerprints and generate data identifying the received fingerprints. When the biometric input device 106 is a fingerprint reader, the computing device 100 may include a fingerprint processing module 108 for analyzing fingerprint data received by the biometric input device 106. Although the biometric input device 106 and the fingerprint processing module 108 are shown in this illustrative embodiment, it can be appreciated that other configurations for generating and analyzing fingerprint data may be utilized. For instance, it can be appreciated that the biometric input device 106 may operate alone to generate and analyze fingerprint data. Fingerprint data 122 may be stored in a secure location of the computing device 100, such as the security data 118 of the mass storage device 116. It should be appreciated that the security data 118 can be encrypted using any one or a number of known techniques.

The security data 118 may also store other configuration information that associates fingerprint data with one or more operations, such as an unlock operation or a pre-unlock operation, which are respectively performed by the unlock module 112 and the pre-unlock module 114. In addition, in certain embodiments, stored fingerprint data 122 can be associated with other types of information. For instance, stored fingerprint data can be associated with one or more time periods and one or more locations or geographical areas. In addition, stored fingerprint data can be associated with image data, audio data or any other type of data to be used with embodiments described herein. These associations may enable the unlock module 112 and pre-unlock module 114 to take different actions depending on an input fingerprint and potentially other parameters, such as the time that a fingerprint is entered and/or a geographical location of the device at the time a fingerprint is received. Data identifying some or all of the associations described above may be referred to herein as association data 120.

The stored fingerprint data 122 may also be associated with one more user profiles, such as a first user profile 126 and a second user profile 128. As will be described in more detail below, these associations enable the unlock module 112 and pre-unlock module 114 to present different operating environments depending on an input fingerprint and other parameters. Although user profiles are employed to describe these illustrative examples, it should be appreciated that techniques disclosed herein may utilize any data structure or software capable of modifying, influencing or controlling an operating environment or alternative mode of a device.

Figure 2:
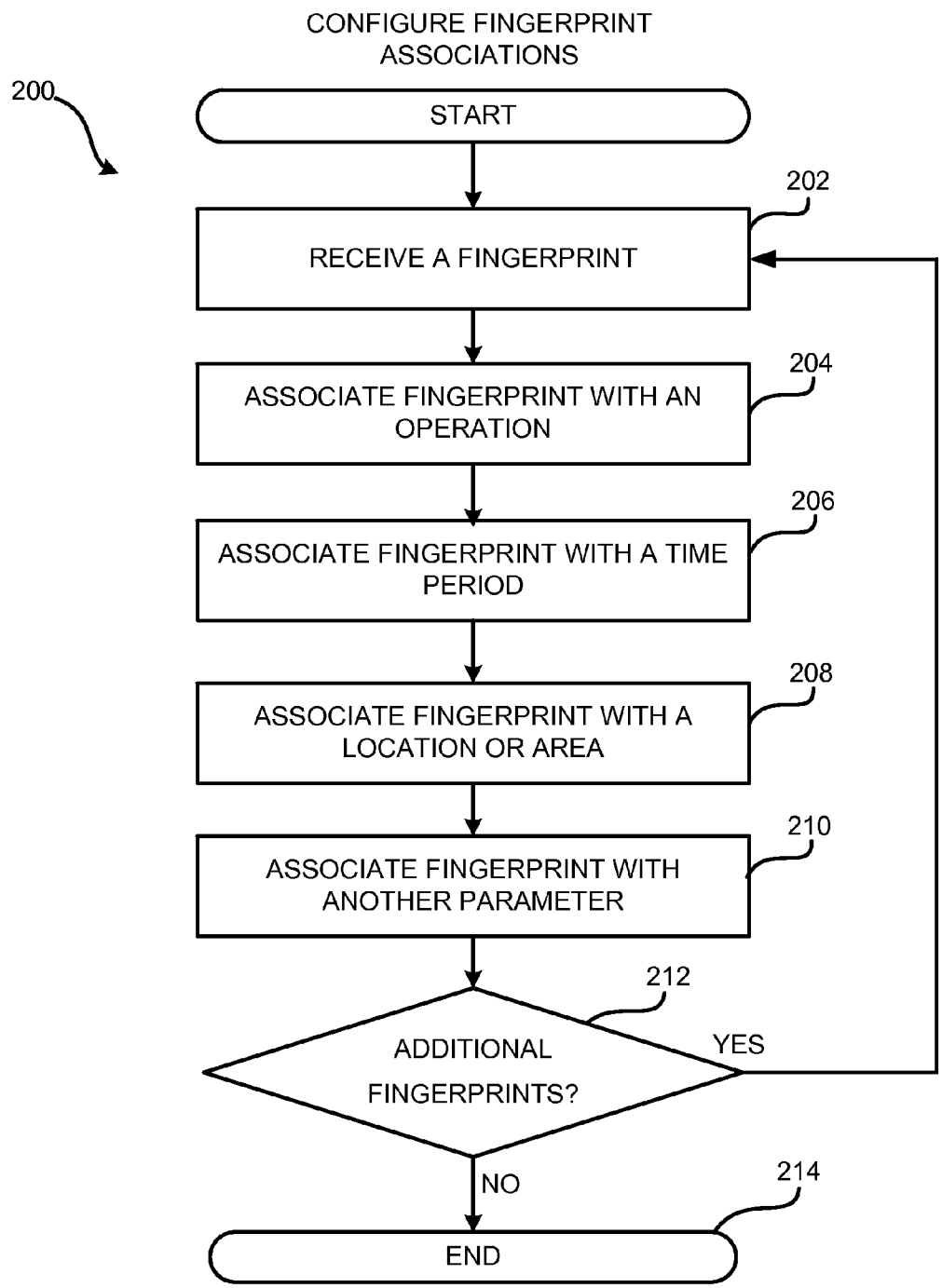
FIG. 2 is a flow diagram illustrating aspects of one illustrative routine for configuring fingerprint data in a computing device, such as the computing device shown in FIG. 1, according to one embodiment disclosed herein.

Referring now to FIG. 2, a flow diagram illustrating aspects of one illustrative routine 200 for configuring the association data 120 and fingerprint data 122 in a computing device 100 will be described. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system. Moreover, and as described above, other components or routines might perform some or all of the functionality described with regard to FIG. 2. However, it can also be appreciated that other components of the computing device may execute, or assist in the execution of, various functions described below.

The implementation of the various components described herein is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. The routine 200 will be described in conjunction with FIG. 1, which shows an illustrative computing device 100 equipped with a biometric input device 106 for receiving a fingerprint from one or more fingers of a user.

The routine 200 begins at operation 202, where the biometric input device 106 receives a fingerprint entry through an appropriate sensor. A user may communicate a fingerprint of any finger by placing a selected finger over the biometric input device 106. Once the selected finger is placed over the biometric input device 106, the biometric input device 106 generates data representing the fingerprint of the selected finger.

It should be appreciated that a single fingerprint or a set of fingerprints may be used to unlock the device 100 or to invoke other operations. A set of fingerprints may involve a multi-fingerprint input, where fingerprints can be entered in any order, or a set of fingerprints may involve a specific sequence of fingerprints. For example, operation 202 may involve the entry of a fingerprint of a left "pinky" finger and a fingerprint of a right thumb. In such an example, the fingerprint processing module 108 generates data representing that set of fingerprints. As will be described in more detail below, a dataset representing that set of input fingerprints can function as a fingerprint signature to unlock the device 100 or to invoke other operations.

To assist in the facilitation of operation 202, and the other operations 204-212 described below, in one illustrative embodiment the device 100 may prompt a user to provide other information, such as sequence and timing preferences along with a fingerprint entry, or fingerprint entries, by displaying and communicating configuration information via an appropriate user interface ("UI"). It should also be appreciated that the biometric input device 106 may operate with the fingerprint processing module 108 to generate fingerprint data 122 representing a single fingerprint or a set of fingerprints. Fingerprint data 122 representing a set of fingerprints may also involve sequence, timing and cadence parameters to allow for more complex fingerprint combinations. For illustrative purposes, data representing a set of fingerprints may also be referred to herein as a "dataset."

It should also be appreciated that the biometric input device 106 may operate alone, or in conjunction with the fingerprint processing module 108, to generate fingerprint data 122 representing different portions of a finger, hand, or any other body part that produces an identifiable print. For example, data representing a fingerprint entry may be produced by the presentation of one side of a fingertip, and data representing another fingerprint entry may be produced by the presentation of the other side of the same fingertip. In another illustrative example, the tip of a finger may produce data representing a fingerprint entry and the base of the same finger may produce data representing another fingerprint entry. Other examples may involve the presentation of a palm or any other body part that produces an identifiable print.

Next, at operation 204, the configuration module 110 associates the generated fingerprint data with an operation based upon received user input. For example, the association data 120 may associate a particular fingerprint with an unlock operation or a pre-unlock operation. As summarized above, if a first fingerprint is associated with an unlock operation, the presentation of that first fingerprint while the device is in a locked state, causes the device to transition from the locked state to an unlocked state in a traditional fashion. If, however, a second fingerprint is associated with a pre-unlock operation, the presentation of that second fingerprint while the device is in a locked state causes the device to take one or more actions of a pre-unlock operation before transitioning the device from the locked state to an unlocked state. Also disclosed herein, other operations, such as alternative pre-unlock operations, may be associated with one or more fingerprints.

Next, at operation 206, the configuration module 110 may associate the fingerprint data with a time period. As described in more detail below, the association of a fingerprint with a time period may enable a device to control when a fingerprint can activate a particular operation. For example, the association data 120 can provide an indication that a fingerprint may cause the unlock module 112 to execute the unlock operation at all times. Alternatively, a fingerprint may be associated with a specific time period that only enables that fingerprint to execute the unlock operation within, or outside of, that specific time period. In a non-limiting example, a specific fingerprint may be associated with a time period that only allows that fingerprint to be used during weekdays between 8 AM and 5 PM. This example, and the others presented herein, is intended to be illustrative and not limiting.

Next, at operation 208, the configuration module 110 may associate the fingerprint data 122 with a particular geographic location, area or zone. As described in more detail below, the association of fingerprint data with a location or area enables a device 100 to control whether a particular fingerprint operates within, or outside of, a geographical location. In a non-limiting example, a specific fingerprint may be associated with location data that only allows that fingerprint to be used in a particular city, state, country or any other user defined geographical area. Again, this particular example is meant to be illustrative and not limiting.

Next, at operation 210, the configuration module 110 may associate the fingerprint data 122 with other parameters. As described in more detail below, the association of fingerprint data with other types of information, such as an image or sound, enables a device to control whether a particular fingerprint operates in conjunction with other types of input or conditions. In a non-limiting example, a specific fingerprint may be associated with an image of a user. Having such data stored in the security data 118, a pre-unlock operation may only enable a particular fingerprint if the camera of a device identifies an image that resembles or relates to stored image data. Such conditions can apply to sounds and/or other data from a motion sensor, which may indicate if the device is held in a particular orientation or direction. Again, these particular examples are meant to be illustrative and not limiting.

Next, at operation 212, the configuration module 110 determines if there are additional fingerprints to be processed for use in the configuration of the device 100. If it is determined that there are no additional fingerprints, the routine 200 ends at operation 214. However, if it is determined that there are additional fingerprints, the routine 200 returns to operation 202 where the biometric input device 106 receives an additional fingerprint or a set of fingerprints. As summarized above, aspects of operation 212 can be facilitated by the use of a graphical UI to prompt the user to enter one or more fingerprints and communicate configuration information and/or other information to the user. In addition, it should also be appreciated that data describing the associations that are created between fingerprints, operations and/or other location and time period parameters may be stored in a secure location in a device, such as the security data 118 of the mass storage device 116.

It should be appreciated that a device can be configured with a number of fingerprints, which may increase the security of the device 100. For example, it can be appreciated that several iterations of the routine 200 may be utilized to define different behaviors of the device 100 in a number of different access scenarios. In a non-limiting example, configuration settings of the device 100 may allow a fingerprint of a right thumb to unlock the device on any Monday, but that same fingerprint may cause the device 100 to perform a pre-unlock operation to modify data of the device 100 on any Tuesday. There are many options for combining the associations created in routine 200 for increasing the security of the device 100. In another non-limiting example, a particular fingerprint combination, such as a right pinky finger and right thumb, may unlock the device 100 within a particular country, but that same fingerprint combination may cause the device 100 to perform a pre-unlock operation to perform a factory reset if the device 100 is outside of that particular country during any weekend. Various mechanisms known to those skilled in the art might be utilized to determine the geographic location of the computing device 100.

It should also be appreciated that the device 100 can be configured to perform various pre-unlock operations. For example, the device 100 may be configured to associate the fingerprint of a right pinky finger with a pre-unlock operation to delete email messages. At the same time, the fingerprint of a right index finger may be associated with a pre-unlock operation to delete all text messages stored on the device 100. As can be appreciated, and as described in detail below, a range of various pre-unlock operations can be associated with a number of fingerprints and other parameters, such as location and time parameters.

Although the configuration features illustrated in the routine 200 and described above show associations between fingerprint data 122, unlock operations, pre-unlock operations, locations and time periods, it should also be appreciated that the disclosed mechanisms may include different combinations of these associations. For instance, security data 118 stored on a device 100 may only associate fingerprint data 122 with one or more operations, such as an unlock operation and one or more pre-unlock operations. In addition, in other embodiments, the security data 118 stored on the device 100 may only associate fingerprint data 122 with an unlock operation and location data. Further, other configurations of the security data 118 may only associate fingerprint data 122 with an unlock operation and data describing one or more time periods.

In addition to establishing the above-described configuration settings for associating fingerprint data 122 with one or more operations, mechanisms for associating user data with one or more pre-unlock operations are also provided. As summarized above and described in greater detail below, the pre-unlock operations may secure, hide, remove, move, encrypt, disassociate, communicate or modify data stored on the device 100 and/or remote locations. To implement such mechanisms, the security data 118 may store association data 120 for any type of file or data object. As will be described in more detail below, the association data 120 can be used by various operations to determine an action for such selected items.

In one illustrative example, the security data 118 of a device 100 may store association data 120 that associates certain types of information with a particular pre-unlock operation that is invoked if a duress input is received. In a non-limiting example, email messages may be deleted if a duress input or an unknown fingerprint is used to access a device. In other examples, other types of data, such as encryption keys, individual phonebook entries, and text messages, can be associated with different operations. Such association data 120 enables a device 100 to take different actions depending on a received fingerprint and/or other parameters. As will be described in more detail below, the pre-unlock operations disclosed herein may utilize some or all of the configuration data described above to hide, delete, move or otherwise process selected information when a duress input is received.

It should also be appreciated that a process for generating and updating association data 120 can be facilitated by the use of a graphical UI to prompt a user to enter one or more selections to customize the association data. For instance, a graphical UI may list one or more items, such as file names, contact names, categories of contacts, or any other type of data, and allow the user to select an action, e.g., hide or delete, for items on the list. Further, it should be appreciated that a process for configuring and/or updating the association data 120 and fingerprint data 122 may involve remote computers, servers, services, or any other computing device. For instance, the association data 120 and fingerprint data 122 of the device 100 may be received from one or more remote computers, such as the remote computer (650 of FIG. 6). In addition, association data 120 and fingerprint data 122 of the device 100 may be communicated to a remote computing device and/or service for storage. Such remote computing devices and/or services may also distribute the association data 120 and fingerprint data 122 to other computing devices. When such configuration data is shared between devices and/or remote computers, multiple devices associated with a particular user may be accessed using the same fingerprint data. In addition, when association data 120 and/or other data is sent from a remote computer to the device 100, the remote computer can update security policies of the device 100. In one illustrative example, association data 120 and other data may be sent to the device 100 so that the device 100 deletes user data upon the presentation of a particular fingerprint. In another example, association data 120 and other data may be sent to the device 100 to configure and/or update a pre-unlock and/or an unlock operation to take one or more actions.

Figure 3:
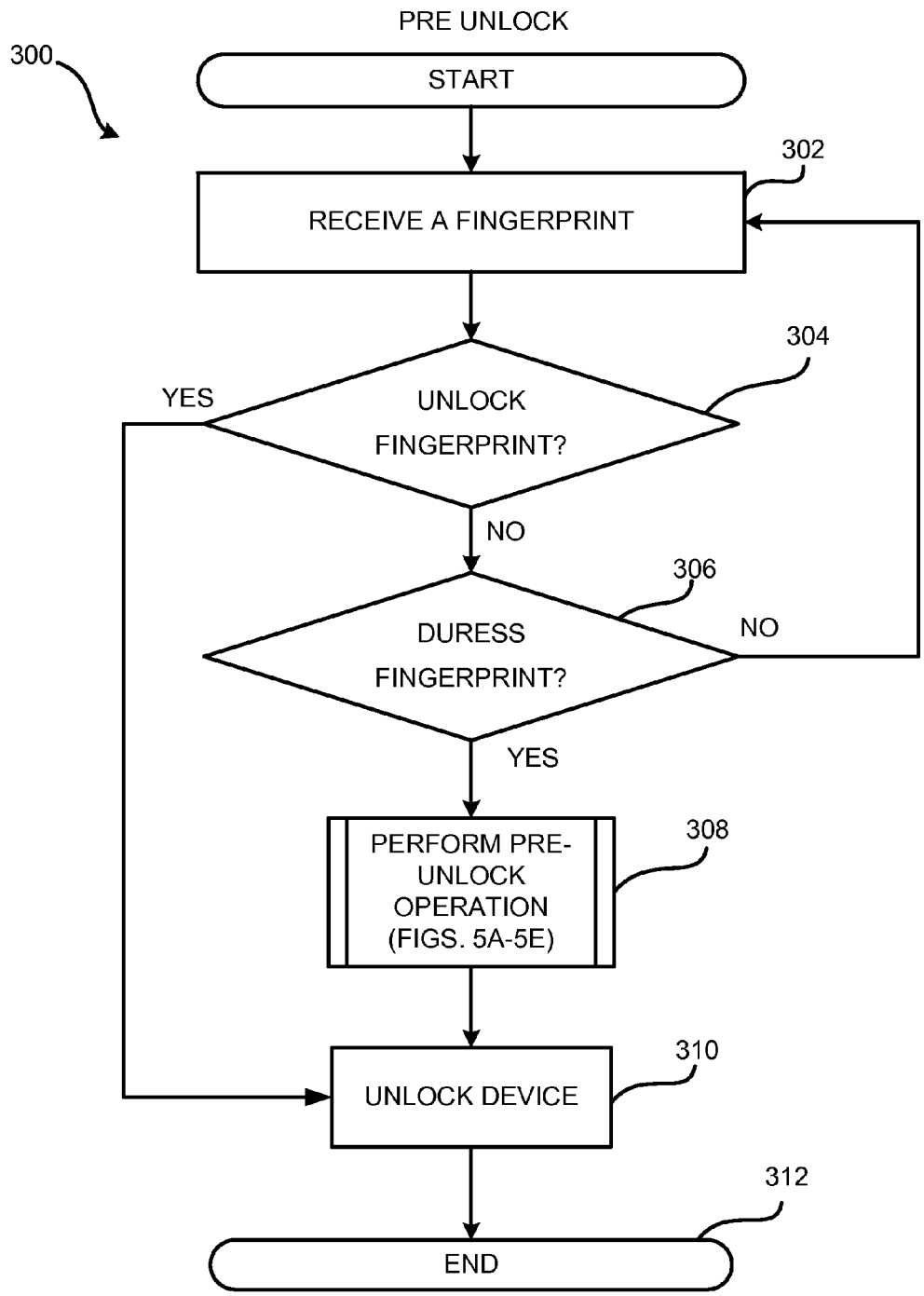
FIG. 3 is a flow diagram illustrating aspects of one illustrative routine for receiving an input fingerprint and performing a pre-unlock operation, according to one embodiment disclosed herein.

Referring now to FIG. 3, a flow diagram showing aspects of one illustrative routine 300 for receiving an input and executing a pre-unlock operation, according to one embodiment disclosed herein will be described. The routine 300 begins at operation 302, where a biometric input device 106 of the computing device 100 receives an input fingerprint. When a user places a selected finger over the biometric input device 106, the biometric input device 106 reads the fingerprint of the selected finger and generates data representing the fingerprint. For embodiments involving a multi-fingerprint input, computer-implemented mechanisms may generate an input dataset that represents the set of received fingerprints. Sequence, timing and cadence parameters might also be generated that are related to a multi-fingerprint input. Such parameters may also be a part of the generated dataset.

From operation 302, the routine 300 proceeds to operation 304, where the fingerprint processing module 108 determines if the data representing the input fingerprint, or the input dataset, is associated an unlock operation. As noted above, this determination may be made by the use of security data 118 stored on the device 100. In such an embodiment, comparisons are made between the data of the input fingerprint and data of the first fingerprint and the second fingerprint stored in the security data 118.

If, at operation 304, it is determined that the data representing the input fingerprint is associated with the first fingerprint, and thus determining that the input fingerprint is also associated with the unlock operation, the routine 300 proceeds to operation 310 where the unlock module 112 transitions the device from the locked state to an unlocked state in a traditional fashion (i.e. without performing a pre-unlock operation). For embodiments involving a multi-fingerprint input, operation 304 may determine if the input dataset is associated with a dataset stored in the security data. In such an embodiment, operation 304 would utilize an input dataset and one or more datasets stored in the security data to make the association between the input dataset and the unlock operation.

At operation 304, if it is determined that the data representing the input fingerprint is not associated with the first fingerprint, and thus determining that the input fingerprint is not associated with the unlock operation, the routine 300 proceeds to operation 306 where the fingerprint processing module 108 determines if the data representing the input fingerprint has been associated with a pre-unlock operation. Similar to operation 304, operation 306 may compare data of the input fingerprint, or the input dataset, with one or more fingerprints or datasets stored in the security data 118. If, at operation 306, it is determined that the data representing the input fingerprint or the input dataset is not associated with the second fingerprint, and thus determining that the input fingerprint or the input dataset is not associated with the pre-unlock operation, the routine 300 returns to operation 302 where the biometric input device 106 may process another fingerprint input in the manner described above.

If, at operation 306, it is determined that the data representing the input fingerprint is associated with the second fingerprint, and thus determining that the input fingerprint is also associated with the pre-unlock operation, the routine 300 proceeds to operation 308 where the pre-unlock module 114 performs a pre-unlock operation. As summarized above, the pre-unlock operation may secure, hide, remove, encrypt, move or modify data. In some embodiments, for example, the pre-unlock operation may delete user-selected data. In such embodiments, the device 100 may store configuration data or security data describing user-selected objects, files, and other predetermined groups of data to be deleted when a duress input is received. For example, and as summarized above, the pre-unlock operation may remove data associated with a particular email account, specific email messages, a password manager, an application, browser data, and/or any other combination of selected data. In other examples, the pre-unlock operation may be configured to delete all text messages associated with a particular phone number.

In an alternative embodiment, instead of, or in conjunction with, deleting user data, a pre-unlock operation may be configured to delete an encryption key when a duress input is received. In such an embodiment, the device 100 may have an encryption key that allows the device 100 to access a volume of data that would normally be mounted upon boot. However, if a duress input is received, and a pre-unlock operation deletes the public key, the volume of data still exists but it cannot be accessed until the public key is reinstalled on the device 100. In the embodiments described herein, it can be appreciated that the pre-unlock operation may also direct services and/or other networked computers to delete or modify data stored in remote locations.

In other embodiments, which may operate in conjunction with, or alternative to, other embodiments, the pre-unlock operation may be configured to hide selected data. In a non-limiting example, a pre-unlock operation may be configured to hide information related to a particular email account if a duress input is received. In another non-limiting example, a user may elect to have their browsing history and one or more particular contact names hidden from display if a duress input is received. This selected data can remain hidden until the device is locked and subsequently accessed using the unlock fingerprint. It should be appreciated that embodiments of the pre-unlock operation may utilize configuration data or security data to enable the pre-unlock operation to hide data. It should also be appreciated that the use of such configuration data or security data also allows for combinations of pre-unlock operations. In one illustrative example, a pre-unlock operation may hide email messages stored on the device 100 and also delete browsing data. These examples are provided by way of illustration only and should not be construed as limiting.

In addition to deleting or hiding data, other embodiments may include the storage and utilization of alternative profile data to allow the device 100 to operate in an alternative operating environment when a duress input is received. For example, when a duress input is received, the use of alternative profile data may direct the device 100 to provide an alternative operating environment with a blank desktop or "home" screen. In other examples, alternative profile data may direct the device 100 to provide an alternative operating environment with a set list of stored data, such as images, applications, etc. The utilization of such an embodiment enables the device 100 to diminish the appearance that a pre-unlock process has been invoked, or that the device 100 may be running in a "safe" mode of operation. In addition, the utilization of such an embodiment enables the device 100 to quickly enter an operating environment while a pre-unlock operation is running in the background to process user data. Such an embodiment also helps diminish the appearance that a pre-unlock process is occurring, particularly when the pre-unlock operation is tasked to process large amounts of data.

Another pre-unlock operation performs a factory reset. It should be appreciated that there are a number of ways to execute a factory reset on a device 100. For example, a pre-unlock operation may call application programming interfaces ("APIs") of an operating system 104 executing on the device 100 to perform a factory reset. In addition to, or an alternative to, using the functionality of an operating system 104, a pre-unlock operation may provide additional functions to ensure user data is properly removed from the device 100. For example, embodiments of the pre-unlock operation may include procedures to write data over memory sectors or data files. In such embodiments, a number of methods for overwriting and/or erasing memory, such as a flash memory module, can be performed so that a low level examination of the memory will not reveal deleted data. This may include writing and re-writing data over deleted memory sectors a number of times to remove residual traces of deleted data. As can be appreciated, other processes for removing residual traces of deleted data may also be used.

In other embodiments, if the operating system 104 does not support a factory reset function, the pre-unlock operation may remove personal information from the device 100, including but not limited to, personal contact information, call logs, browsing data and the like. Such embodiments may also utilize one or more factory-installed mechanisms or third-party applications to reset or reinstall the operating system 104. For illustrative purposes, the term "factory reset" includes any process or function that removes user data and resets the operating system 104 and/or any application or application setting to a default state, or near default state, which may be close to, or identical to, the state of the device 100 at the time of manufacturing. Additional details regarding some pre-unlock operations will be described below with regard to FIGS. 5A-5E.

Upon completion or after the execution of operation 308, the routine 300 proceeds to operation 310 where the unlock module 112 transitions the device 100 from the locked state to an unlocked state. Upon conclusion of the operation 310, the routine 300 ends at operation 312.

It should also be appreciated that some embodiments of routine 300 may process operation 308 in parallel, at least in part, with operation 310. In other embodiments, routine 300 may process operation 308 before performing operation 310. Depending on the device configurations and desired performance results, implementations utilizing such embodiments enable the device to diminish the appearance that a pre-unlock operation is running while the device 100 is being accessed.

In addition to being used with a duress input, it should also be appreciated that a pre-unlock operation may be used in conjunction with an unrecognized fingerprint. In addition, it can also be appreciated that a pre-unlock operation may be used in conjunction with an unlock fingerprint. For example, if an unlock fingerprint is received, the device 100 may take one or more alternative actions, including the actions of modifying data and maintaining a locked state of the device 100, if the device 100 is not in a predetermined area, or if the time fingerprint input is not within a predetermined time period.

Figure 4:
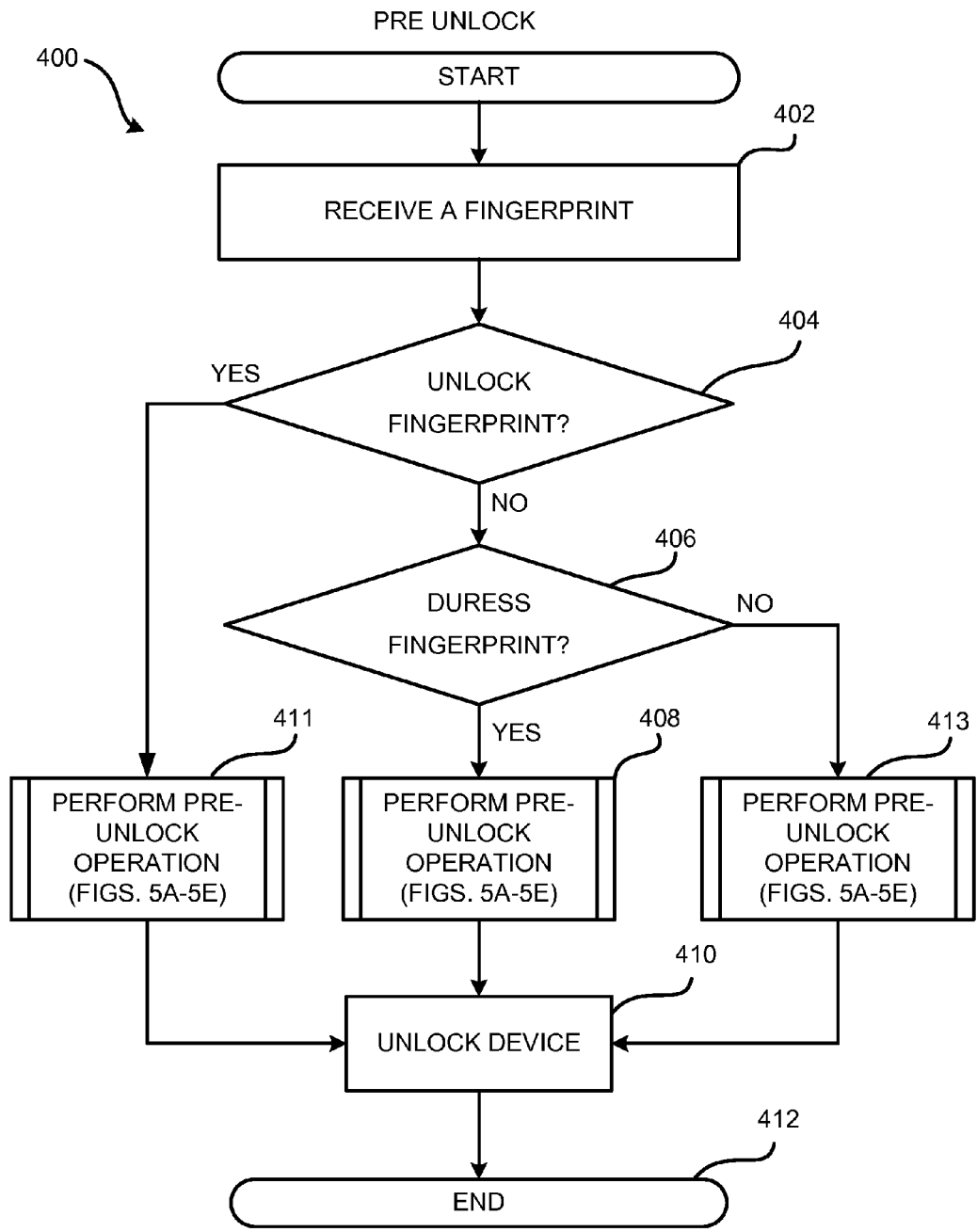
FIG. 4 is a flow diagram illustrating aspects of another illustrative routine for receiving an input fingerprint and performing a pre-unlock operation, according to one embodiment disclosed herein.

Referring now to FIG. 4, a flow diagram showing aspects of one illustrative routine 400 for executing a pre-unlock operation that may be utilized with an unknown fingerprint or an unlock fingerprint, according to one embodiment disclosed herein. Routine 400 begins at operation 402 where the biometric input device 106 of the computing device 100 receives an input fingerprint. Next, at operation 404, the fingerprint processing module 108 determines if the data representing the input fingerprint, or the input dataset, is associated with an unlock operation. As described above, the security data 118 may be utilized by the fingerprint processing module 108 to determine if there is an association between the input fingerprint and one or more operations, such as the unlock operation. If, at operation 404, it is determined that the data representing the input fingerprint is associated with the unlock operation, the routine 400 proceeds to operation 411 where the pre-unlock module 114 performs a pre-unlock operation.

If, at operation 404, it is determined that the data representing the input fingerprint is not associated with the unlock operation, the routine 400 proceeds to operation 406 where the fingerprint processing module 108 determines if the data representing the input fingerprint has been associated with a duress input. If it is determined that the input fingerprint has been associated with a duress input, the routine proceeds to operation 408 where the pre-unlock module 114 performs another pre-unlock operation. However, if it is determined that the input fingerprint has not been associated with a duress input, and thus it is determined that the input fingerprint is an "unknown" fingerprint (i.e. has not been previously defined as an unlock fingerprint or a duress fingerprint), the routine 400 proceeds to operation 413 where the pre-unlock module 114 may perform another pre-unlock operation.

Upon completion or after the execution of operations 411, 408 or 413, the routine 400 proceeds to operation 410 where the unlock module 112 transitions the device 100 from the locked state to an unlocked state. Upon conclusion of the operation 410, the routine 400 ends at operation 412. By use of routine 400, one or more pre-unlock operations, which may be based on one or more parameters in the security data 118, may be used to protect or delete data even if a primary fingerprint or an unknown fingerprint is received.

Referring now to FIGS. 5A-5E, additional details regarding several illustrative pre-unlock operations will be will be provided. As summarized above, pre-unlock operations may include securing, hiding, removing, encrypting, moving, communicating or modifying data stored on the computing device 100 and/or stored at remote locations. As described below, and shown in FIGS. 5A-5E, various pre-unlock operations may be performed individually or in combination.

Figure 5A:
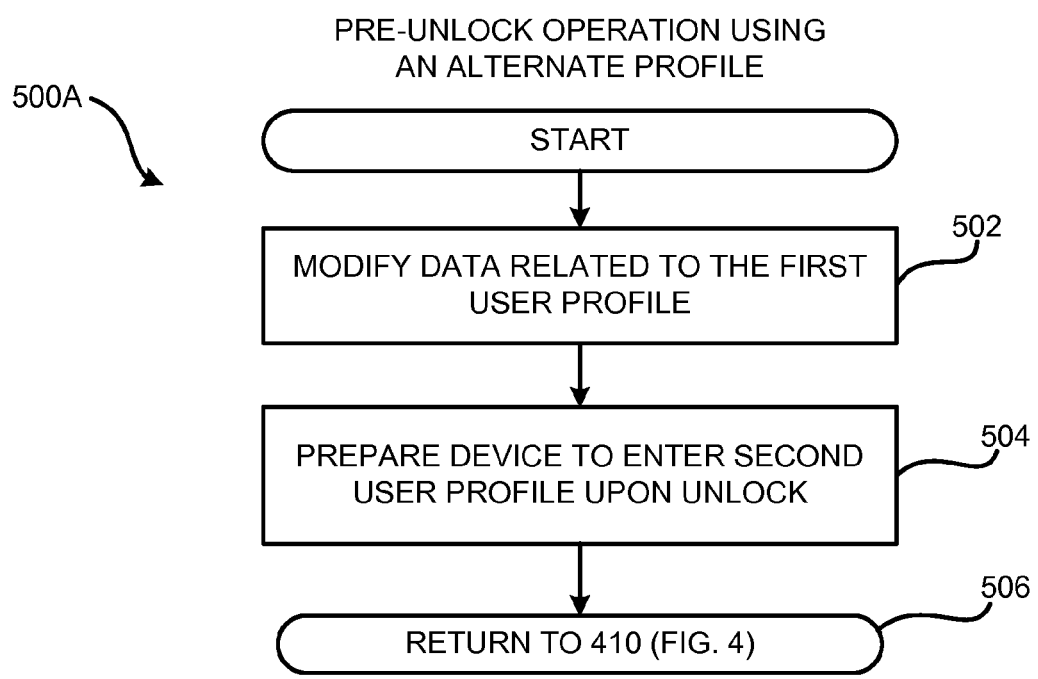
FIGS. 5A-5E are flow diagrams showing aspects of several illustrative routines for performing the pre-unlock operation illustrated in FIG. 4, according to various embodiments disclosed herein.

FIG. 5A is a flow diagram showing operations for implementing a pre-unlock operation that utilizes two user profiles, such as the first user profile 126 and the second user profile 128 shown in FIG. 1. In an example utilizing these user profiles, configuration data or security data 118 of the computing device 100 is arranged such that a first fingerprint is associated with an unlock operation, which causes the computing device 100 to present a first operating environment that utilizes data of the first user profile 126. In addition, a second fingerprint is associated with a pre-unlock operation, which causes the computing device 100 to present a second operating environment that utilizes data of the second user profile 128. For illustrative purposes, the first operating environment is referred as the "primary operating mode" of the device and the second operating environment is referred as the "alternative operating mode."

The routine 500A starts at operation 502 where the pre-unlock module 114 modifies data associated with the first user profile 126. In one embodiment, the operation 502 may utilize security data or a configuration file to identify an operation that may apply to selected data. For instance, the security data or the configuration file may provide an indication that all encryption keys associated with the first user profile 126 are to be deleted. Such an embodiment reduces the need to delete all user data, and access to such user data can be achieved by a subsequent introduction of the deleted encryption key.

In other examples, operation 502 may delete the first user profile 126 from memory. In other embodiments, operation 502 may encrypt all or part of the first user profile 126. As described herein, there are a number of other actions that can be performed to modify data. Thus, these examples are provided by way of illustration only and should not be construed as limiting.

Next, at operation 504, security data stored on the device is modified or used to prepare the device to enter an operating environment that is based on the second user profile 128 when the device is unlocked (operation 310 of FIG. 3). Operation 506 may involve the modification of the security data of a device 100 such that the second user profile 128 appears to be the primary operating mode of the device 100. In addition, the second user profile 128 may contain "dummy" data to mitigate the appearance that the device has entered a safe mode. Dummy data may include user-selected data that gives the appearance the second user profile is being used. For instance, the second user profile may be configured with images, account information, contacts and other information, which may include a subset of data of the first user profile or preselected data. Next, the routine 500A proceeds to operation 506 where the routine returns to operation 410 of FIG. 4.

Figure 5B:
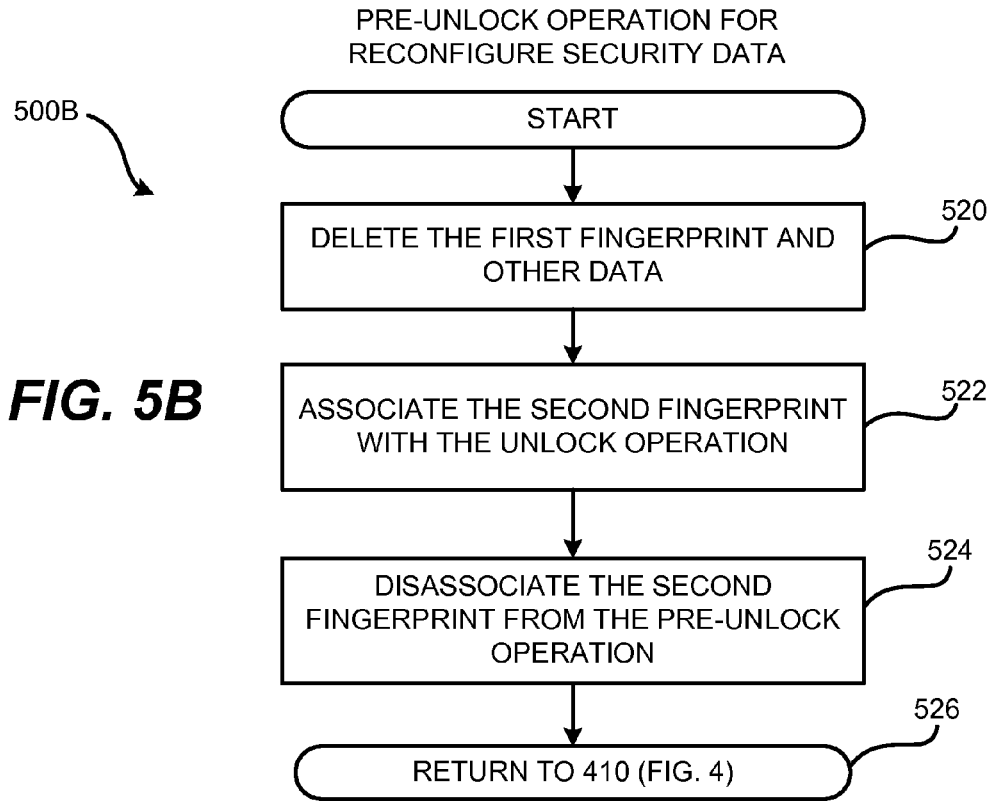

FIG. 5B is a flow diagram showing aspects of another pre-unlock operation that involves the reconfiguration of the security data 118. In this pre-unlock operation, if a duress input is received, operation 500B reconfigures the security data 118 to remove data identifying the primary fingerprint for accessing the device 100. In addition, the security data 118 is also reconfigured so the duress fingerprint is assigned as the primary fingerprint for accessing the device 100. This implementation may help prevent the discovery of the primary fingerprint and may mitigate indications that the device 100 is entering a safe mode.

Referring to FIG. 5B, the routine 500B begins at operation 520, where the pre-unlock module 114 deletes the data of the first fingerprint. In this operation, data describing, identifying or related to the first fingerprint can be removed from the device. For embodiments involving a multi-fingerprint input, operation 520 may delete the dataset that includes one or more primary fingerprints used for accessing the device. In such an embodiment, operation 520 may also remove other accompanying data, including data describing any type of fingerprint input sequencing, timing, etc. In some embodiments, operation 520 may involve the removal of other user data that has been marked for deletion in the event a duress input is received. In addition, some embodiments of operation 520 may involve the removal of an encryption key used to access data related to the first fingerprint. Such an embodiment reduces the need to delete all user data, and access to such user data is possible with a subsequent introduction of the encryption key.

From operation 520, the routine 500B proceeds to operation 522, where the pre-unlock module 114 associates the second fingerprint (i.e. the duress fingerprint) with the unlock operation. From operation 522, the routine 500B proceeds to operation 524, where the pre-unlock module 114 disassociates the second fingerprint from the pre-unlock operation. From operation 524, the routine 500B proceeds to operation 526, where the routine returns to operation 310 of FIG. 3 or operation 410 of FIG. 4. It should also be appreciated that with these modifications to the security data 118, the device 100 can be accessed using the second fingerprint while mitigating the risk of exposing the original security data settings.

Figure 5C:
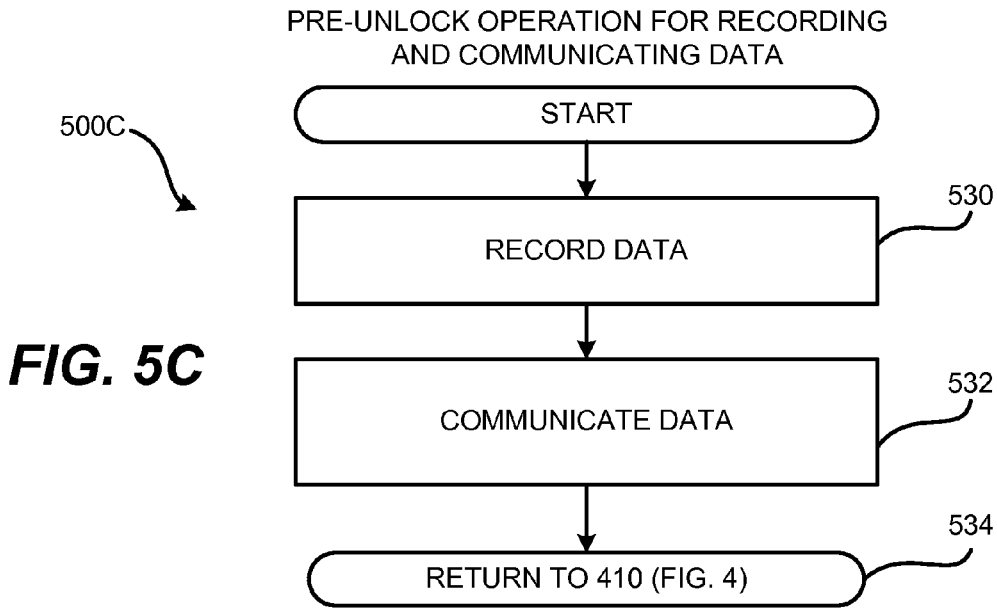

FIG. 5C is a flow diagram showing aspects of another pre-unlock operation for recording and communicating data. This pre-unlock operation may record and communicate many types of information. For example, if a duress input is received, the pre-unlock operation may control a camera of the computing device 100 to take a picture or video of the user entering the fingerprint, record the location of the computing device 100 and data received from a network, and send that information, along with data of the input fingerprint, to a remote computer.

Referring to FIG. 5C, the routine 500C begins at operation 530, where the pre-unlock module 114 records, obtains and/or captures data. As summarized above, embodiments of operation 530 may include the use of any input device, such as a camera, motion sensor, microphone, GPS device, and/or a fingerprint reader. When a duress input is received, data from such devices can be captured or recorded. It should also be appreciated that operation 530 may utilize data from other remote devices, such as a web cam, a location tracking service, or any other user selected service or resource.

Next, at operation 532, the recorded/captured data is communicated to a remote device, server, service, and/or any other designated resource. As summarized above, operation 532 may include the communication of video or image data captured during the receipt of the fingerprint, data describing the received fingerprint, location information, and/or any other recorded audio. Although the above described embodiments involve the process of recoding data, it should be appreciated that the data described above may not be stored on the device, as operation 532 may involve real-time communication of such information without the need for the device to record or store the data. It should also be appreciated that data that was already stored on the device may be flagged in a configuration setting for communication in operation 532. Thus, data that has been stored prior to the execution of operation 530, such as existing images or user profile data, may be communicated in operation 532.

In other embodiments of operation 532, the device may communicate information, instructions or other control data to a remote computing device. For instance, in a non-limiting example, operation 532 may provide notice to another system that a duress input has been received. At the same time, operation 532 may provide instructions to a remote computer to delete an email, a block of email messages or an entire account or multiple accounts. In addition, operation 532 may disassociate the device from any remote applications or services. In other embodiments, operation 532 may provide instructions to a remote computer to track the location of the computing device 100 or take other actions. Such embodiments of the pre-unlock operation may utilize all or any combination of such recorded or stored information for communicating with and/or controlling remote computers or services. Next, the routine 500C proceeds to operation 534, where the routine returns to operation 310 of FIG. 3 or operation 410 of FIG. 4.

As summarized above, the data communicated in routine 500C enables a remote service or remote computer to perform one or more actions. If location data is communicated, a remote computer may track the location of the device 100. If image or audio information is communicated, such information may be used to identify a user of the device 100. In other examples, location and fingerprint data may be communicated to a remote computer where it may be used to verify and/or validate a fingerprint entry. In one illustrative example, if time and location data is communicated to a remote computer with each fingerprint entry, the remote computer may detect other contextual inconsistencies. In such an example, if a fingerprint is used twice, with only 5 minutes between each entry, and each entry occurred in respective locations that are over 500 miles from one another, the remote computer may initiate one or more alarms and/or take other action, which may include erasing user data. These examples are provided by way of illustration only and should not be construed as limiting.

Figure 5D:
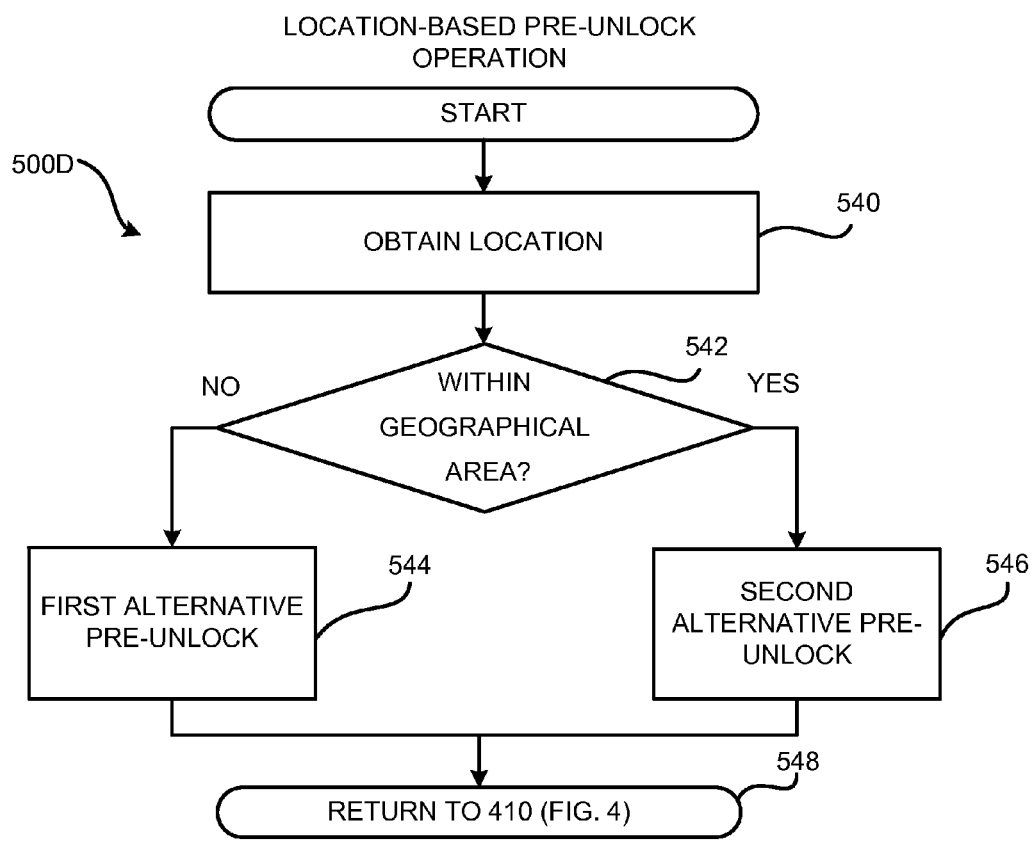

FIG. 5D is a flow diagram showing aspects of another pre-unlock operation that utilizes geographical location information. As described above, the computing device 100 may be configured with a number of pre-unlock embodiments. In addition, the various pre-unlock operations of the computing device 100 can be activated, deactivated or modified depending on the geographical location of the device. In one non-limiting illustrative example, a pre-unlock operation may delete an email account on a computing device if the device is within a designated region, but the pre-unlock operation may also direct a remote server to delete all emails if the computing device is outside the designated region.

Referring to FIG. 5D, the routine 500D begins at operation 540, where the pre-unlock module 114 obtains information describing the location of the device 100. As can be appreciated, the location of the device can be obtained using a number of techniques. For example, in a non-limiting example, information describing the location of the device 100 can be retrieved by the use of a GPS device, such as the GPS device 622 shown in FIG. 6. The location of the device 100 can also be obtained by the use of network data from a local area network or other like systems. These examples are provided by way of illustration only and should not be construed as limiting.

Next, at operation 542, the pre-unlock module 114 determines if the location of the device 100 is within a predetermined location or a geographical location. Embodiments of operation 542 may utilize location information stored in the security data 118, as described above with reference to FIG. 2. If it is determined that the device 100 is not within the predetermined location, the operation 500D proceeds to operation 544 where pre-unlock module 114 performs a first alternative pre-unlock operation. However, if is determined that the device 100 is within the predetermined geographical location, the routine 500D proceeds to operation 546 where the pre-unlock module 114 performs a second alternative pre-unlock operation.

In applying routine 500D to an illustrative example, the first alternative pre-unlock operation may be configured to delete all emails on the computing device 100. In addition, the first alternative pre-unlock operation may also direct an online service to delete all email messages stored on a remote server. The second alternative pre-unlock operation may be configured to just delete all email messages on the computing device 100. Thus, the routine 500D illustrates one pre-unlock operation that can take different actions depending on the location of the device 100. From operation 544 or 546, the routine 500D proceeds to operation 548, where the routine returns to operation 310 of FIG. 3 or operation 410 of FIG. 4.

It should also be appreciated that an alternative pre-unlock operation may include any function, or any combination of functions described herein. For instance, an alternative pre-unlock may secure, hide, remove, move, encrypt, disassociate, communicate or modify data stored on the device and/or remote locations. In addition, an alternative pre-unlock operation may be configured to take no action. Thus, if a device is in a locked state, and such an embodiment of an alternative pre-unlock operation is executed, the device may remain in the locked state.

Figure 5E:
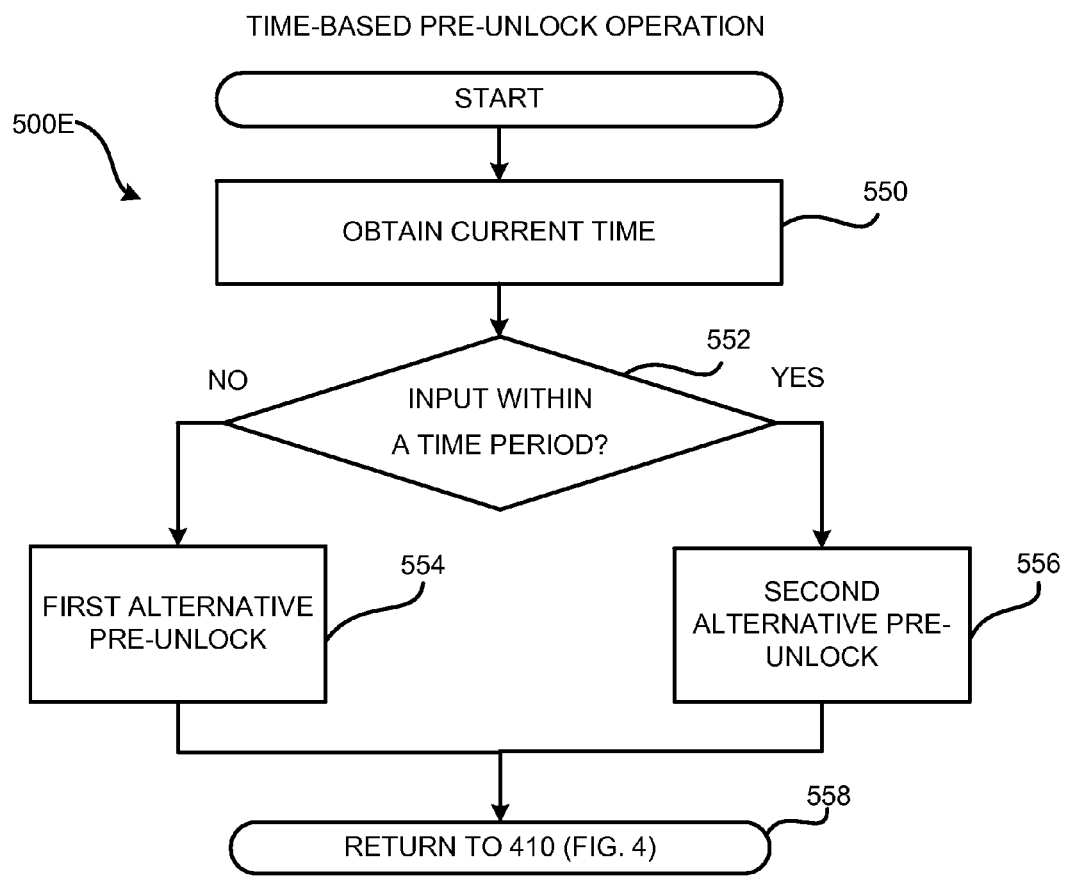

Referring now to FIG. 5E, another pre-unlock operation that utilizes timing parameters is shown and described. As also summarized above, the pre-unlock operation may be activated, deactivated or modified depending on the time a fingerprint input is received. The routine 500E shows one illustrative embodiment of a pre-unlock operation that utilizes timing parameters.

The routine 500E begins at operation 550, where the pre-unlock module 114 obtains the current time. As can be appreciated, the current time can be obtained using a number of techniques. For example, among other non-limiting examples, operation 550 may utilize a clock of the device. Alternatively, or in addition to the use of a clock, time and date information may be obtained by the use of a remote service, data retrieved from network traffic, or any other data maintained on, or communicated to, the device 100.

Next, at operation 552, the pre-unlock module 114 determines if the time of the input fingerprint is within a predetermined time period. Operation 552 may utilize the time period information stored in the security data 118, as described above with reference to FIG. 2. If it is determined that the time of the input fingerprint is not within the predetermined time period, the operation 500E proceeds to operation 554 where the pre-unlock module 114 performs a first alternative pre-unlock operation. However, if it is determined that the time of the input fingerprint is within the predetermined time period, the operation 500E proceeds to operation 556 where the pre-unlock module 114 performs a second alternative pre-unlock operation.

In applying routine 500E to an illustrative example, the first alternative pre-unlock operation may be configured to delete an encryption key stored on the computing device 100. The second alternative pre-unlock operation may be configured to send data representing the input fingerprint to a remote server and perform a factory reset operation on the device 100. Thus, the routine 500E shows another pre-unlock operation that can take different actions depending on the time an input fingerprint is received. From operation 554 or 556, the routine 500E proceeds to operation 558, where the routine returns to operation 310 of FIG. 3 or operation 410 of FIG. 4.

Although FIGS. 5D and 5E illustrate example routines that include two alternative pre-unlock operations, it can be appreciated that a device 100 may be configured with a number of alternative pre-unlock operations, each of which could be associated with unique fingerprints or fingerprint combinations. In one illustrative example, there may be ten different alternative pre-unlock operations, each of which can be associated with a different fingerprint or fingerprint combination. This example is provided by way of illustration only and should not be construed as limiting, as there could be many more variations of pre-unlock or alternative pre-unlock operations embodied in a device 100.

It can also be appreciated that each alternative pre-unlock operation may be triggered by a number of other parameters or conditions, in addition to, or instead of, conditions based on location and time period information. For instance, one example alternative pre-unlock operation may be invoked if an input fingerprint occurred within a time period, while the device 100 is in a particular location, and while the device 100 was being held in a specific orientation relative to the ground. For such an embodiment, data from an accelerometer or motion sensor (615 of FIG. 6) can be used to determine, for instance, if the device 100 was being held with the screen facing the ground, or in an upright position.

Figure 6:
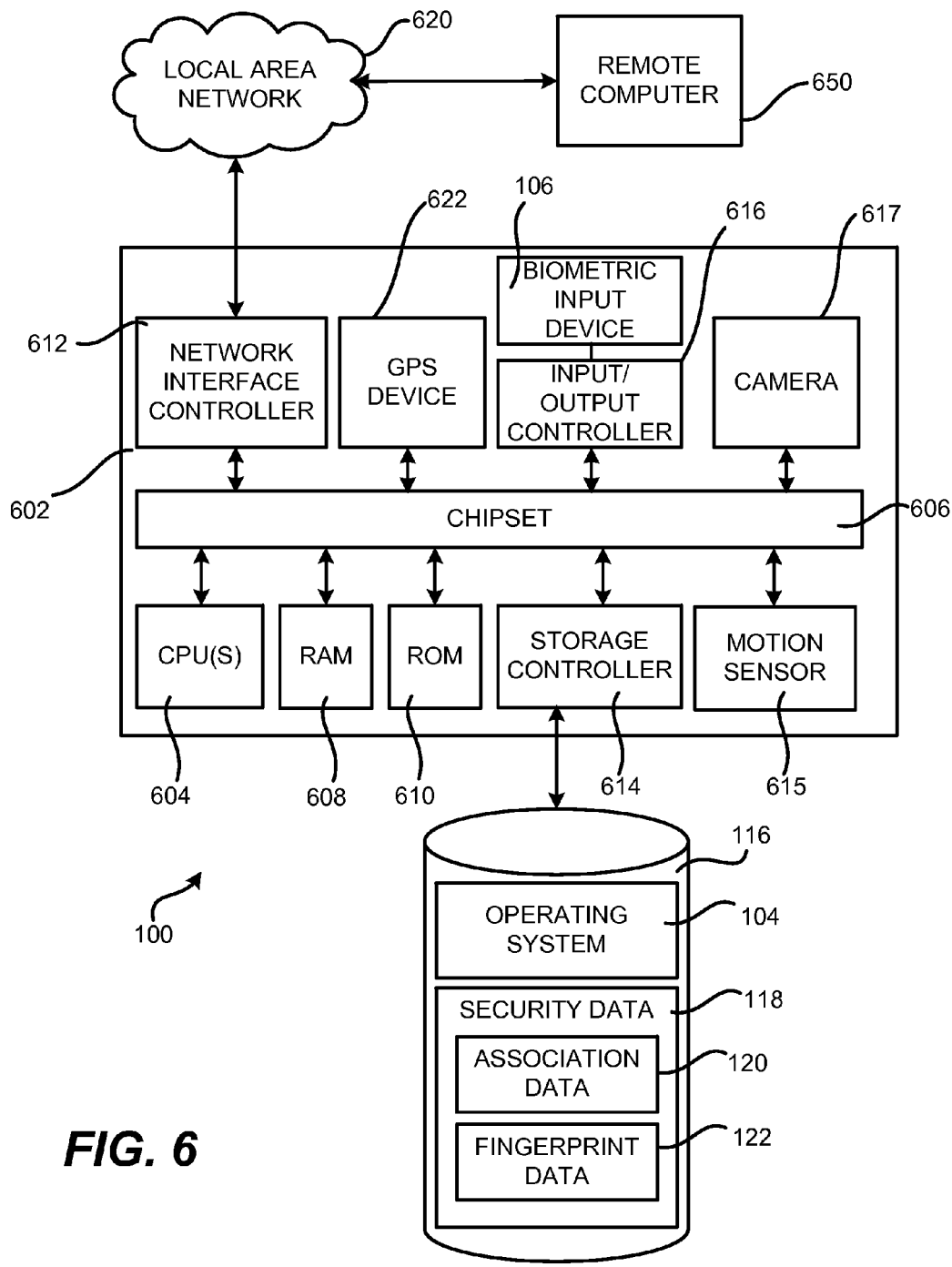
FIG. 6 is a computer architecture diagram showing an illustrative computer hardware architecture for implementing a computing device that might be utilized to implement aspects of the various embodiments presented herein.

FIG. 6 shows additional details of an example computer architecture for the computing device 100 (FIG. 1) capable of executing the program components described above for receiving an input fingerprint and performing a pre-unlock operation. The computer architecture shown in FIG. 6 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above.

The computing device 100 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computing device 100.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 100. The chipset 606 may further provide an interface to a computer-readable storage medium such as a read-only memory ("ROM") 610 or non-volatile RAM ("NVRAM") for storing basic routines that help to startup the computing device 100 and to transfer information between the various components and devices. The ROM 610 or NVRAM may also store other software components necessary for the operation of the computing device 100 in accordance with the embodiments described herein.

The computing device 100 may operate in a networked environment using logical connections to remote computing devices and computer systems through a network, such as the local area network 620. The chipset 606 may include functionality for providing network connectivity through a network interface controller (NIC) 612, such as a gigabit Ethernet adapter. The NIC 712 is capable of connecting the computing device 100 to other computing devices over the network 620. It should be appreciated that multiple NICs 612 may be present in the computing device 100, connecting the computer to other types of networks and remote computer systems. The local area network 620 allows the computing device 100 to communicate with remote services and servers that may be implemented on a remote computer 650.

The computing device 100 may be connected to a mass storage device 116 that provides non-volatile storage for the computing device. The mass storage device 116 may store system programs, application programs, other program modules, and data, which have been described in greater detail herein. The mass storage device 116 may be connected to the computing device 100 through a storage controller 614 connected to the chipset 606. The mass storage device 116 may consist of one or more physical storage units. The storage controller 614 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 116, other storage media and the storage controller 614 may include MultiMediaCard (MMC) components, eMMC components, Secure Digital (SD) components, PCI Express components, or the like.

The computing device 100 may store data on the mass storage device 116 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 116 is characterized as primary or secondary storage, and the like.

For example, the computing device 100 may store information to the mass storage device 116 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 100 may further read information from the mass storage device 116 by detecting the physical states or characteristics of one or more particular locations within the physical storage units.

In addition to the mass storage device 116 described above, the computing device 100 may have access to other computer-readable storage media to store and retrieve information, such as program modules, data structures, or other data. Thus, although the security data 118 and other modules are depicted as data and software stored in the mass storage device 116, it should be appreciated that the security data 118 and/or other modules may be stored, at least in part, in other computer-readable storage media of the device 100. It should also be appreciated by those skilled in the art that computer-readable storage media is any available media that provides for the non-transitory storage of data and that may be accessed by the computing device 100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 116 may store an operating system 104 utilized to control the operation of the computing device 100. According to one embodiment, the operating system comprises the LINUX operating system. According to another embodiment, the operating system comprises the WINDOWS® operating system from MICROSOFT Corporation. According to further embodiments, the operating system may comprise the UNIX, Android, Windows Phone or iOS operating systems. It should be appreciated that other operating systems may also be utilized. The mass storage device 116 may store other system or application programs and data utilized by the computing device 100, such as the security data 118, association data 120, fingerprint data 122 and/or any of the other software components and data described above. The mass storage device 116 may also store data for one or more user profiles to implement aspects of the computer-implemented mechanisms disclosed herein. For example, the mass storage device 116 may store a first user profile 126 and a second user profile 128 to enable embodiments of the device to present different operating environments. The mass storage device 116 might also store other programs and data not specifically identified herein.

In one embodiment, the mass storage device 116 or other computer-readable storage media is encoded with computer-executable instructions which, when loaded into the computing device 100, transform the computer from a general-purpose computing system into a special-purpose computer capable of implementing the embodiments described herein. These computer-executable instructions transform the computing device 100 by specifying how the CPUs 604 transition between states, as described above. According to one embodiment, the computing device 100 has access to computer-readable storage media storing computer-executable instructions which, when executed by the computing device 100, perform the various routines described above with regard to FIGS. 2, 3, 4 and 5A-5E. The computing device 100 might also include computer-readable storage media for performing any of the other computer-implemented operations described herein.

The computing device 100 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 is in communication with a biometric input device 106. Similarly, the input/output controller 616 may provide output to a display, such as a computer monitor, a flat-panel display, a digital projector, a printer, a plotter, or other type of output device. The computing device 100 may also include a GPS device 622 for detecting and monitoring the geographical location of the computing device 100. In addition, the computing device 100 may also include a camera 617 and a motion sensor 615. It will be appreciated that the motion sensor 615 may include one or more accelerometers that can determine the device's orientation relative to the ground, e.g., upside down, right side up, etc. It will be appreciated that the computing device 100 may not include all of the components shown in FIG. 6, may include other components that are not explicitly shown in FIG. 6, or may utilize an architecture completely different than that shown in FIG. 6.

Based on the foregoing, it should be appreciated that technologies for receiving an input fingerprint and performing a pre-unlock operation have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computing device configured to perform a pre-unlock operation comprising:
   a processor;
   a memory;
   an input device; and
   at least one storage device storing or receiving a first dataset identifying at least one fingerprint and a second dataset identifying at least one fingerprint, the first dataset associated with an unlock operation, the second dataset associated with the pre-unlock operation, the at least one storage device also storing computer-executable instructions which, when loaded into the memory and executed by the processor, cause the computing device to
   receive an input from the input device while the computing device is in a locked state, the input comprising an input dataset identifying at least one input fingerprint, compare the input dataset with the first dataset associated with the unlock operation and the second dataset associated with the pre-unlock operation, determine that the input dataset is associated with the second dataset, and in response to determining that the input dataset is associated with the second dataset, perform the pre-unlock operation before transitioning the computing device from the locked state to the unlocked state, wherein the pre-unlock operation is selected based at least partly on one or more of data associated with a location of the computing device or data associated with a time of receiving the input.

2. The computing device of claim 1, wherein the at least one storage device also stores a first data structure associated with the first dataset and a second data structure associated with the second dataset, and wherein the pre-unlock operation comprises:

deleting the first dataset identifying at least one fingerprint, associating the second dataset identifying at least one fingerprint with the unlock operation;

disassociating the second dataset identifying at least one fingerprint from the pre-unlock operation;

modifying data related to the first data structure; and wherein transitioning the computing device from the locked state to the unlocked state causes the device to operate in an operating environment based on the second data structure.

3. The computing device of claim 1, the at least one storage device also storing computer-executable instructions stored thereupon which, when executed by the processor, cause the computing device to:

receive configuration data from a remote computer; and modify at least the first dataset or the second dataset based on the received configuration data.

4. The computing device of claim 1, wherein the at least one storage device has further computer-executable instructions stored thereupon which, when executed by the processor, cause the computing device to communicate the input dataset to a remote computer.

5. A non-transitory computer-readable storage medium having computer-executable instructions stored thereupon which, when executed by a computing device, cause the computing device to:

receive an input fingerprint at an input device of the computing device while the computing device is in a locked state;

determine that the input fingerprint is associated with a fingerprint corresponding to a pre-unlock operation; and in response to determining that the input fingerprint is associated with the fingerprint corresponding to the pre-unlock operation, perform the pre-unlock operation and then exit the locked state, wherein the pre-unlock operation is selected based at least partly on one or more of data associated with a location of the computing device or data associated with a time of receiving the input fingerprint.

6. The computer-readable storage medium of claim 5, wherein the pre-unlock operation to modify data on the device includes the performance of a factory reset operation.

7. The computer-readable storage medium of claim 5, wherein the pre-unlock operation to modify data on the device deletes messages related to a user identifier.

8. The computer-readable storage medium of claim 5, wherein the pre-unlock operation to modify data on the device prevents a collection of data from being displayed on a user interface.

9. The computer-readable storage medium of claim 5, wherein the pre-unlock operation to modify data on the device, comprises:

controlling a first collection of data from being displayed on a user interface; and deleting a second collection of data from the device.

10. The computer-readable storage medium of claim 5, wherein the pre-unlock operation to modify data on the device comprises, deleting a collection of data from the device.

11. The computer-readable storage medium of claim 5, wherein the pre-unlock operation comprises deleting at least one encryption key while not deleting data stored on the computing device that is encrypted by the at least one encryption key.

12. A computer-implemented method for unlocking a computing device, the method comprising performing computer-implemented operations for:

receiving an input fingerprint at an input device of the computing device while the computing device is in a locked state;

comparing the input fingerprint with a first fingerprint associated with an unlock operation and a second fingerprint associated with a pre-unlock operation;

determining that the input fingerprint is associated with the second fingerprint;

initiating the pre-unlock operation, wherein the pre-unlock operation is selected based at least partly on one or more of data associated with a location of the computing device or data associated with a time of receiving the input fingerprint; and in response to completion of the pre-unlock operation, automatically performing the unlock operation to cause the computing device to exit the locked state.

13. The computer-implemented method of claim 12, further comprising:

determining that the input fingerprint is not recognized by the computing device, and initiating the pre-unlock operation before causing the computing device to exit the locked state.

14. The computer-implemented method of claim 12, wherein the pre-unlock operation comprises:

causing an alternative operating environment to be utilized by an operating system of the computing device; and modifying data associated with the first fingerprint.

15. The computer-implemented method of claim 12, wherein the pre-unlock operation comprises:

determining if the location of the computing device is within a predetermined distance from a predetermined location; and if it is determined that the location of the computing device is not within the predetermined distance from the predetermined location, initiating an alternative pre-unlock operation different from the pre-unlock operation.

16. The computer-implemented method of claim 12, wherein the pre-unlock operation comprises:

determining if the time of the receiving is within a predetermined time period; and if it is determined that the time of the receiving is not within the predetermined time period, initiating an alternative pre-unlock operation different from the pre-unlock operation.

17. The computer-implemented method of claim 12, wherein the pre-unlock operation comprises:

deleting data associated with the first fingerprint, wherein deleting the data associated with the first fingerprint produces residual data; and writing data over the residual data until the residual data is removed from the computing device.

18. The computer-implemented method of claim 12, wherein the method further comprises:
  determining if the input fingerprint has been used with a second computing device at a second location that is more than a predetermined distance from the location of the computing device; and
  if it is determined that the input fingerprint has been used with the second computing device at the second location that is more than the predetermined distance from the location of the computing device, initiating an alternative pre-unlock operation.

19. The computer-implemented method of claim 12, wherein the pre-unlock operation comprises:
  obtaining image data from a camera of the computing device; and
  communicating the image data to a remote computer.

20. The computer-implemented method of claim 12, wherein the pre-unlock operation comprises:
  obtaining audio data from a microphone of the computing device; and
  communicating the audio data to a remote computer.

\* \* \* \* \*